May 31, 1932.　　　T. V. BUCKWALTER　　　1,860,702
AXLE HOUSING
Filed Dec. 3, 1930　　　2 Sheets-Sheet 1
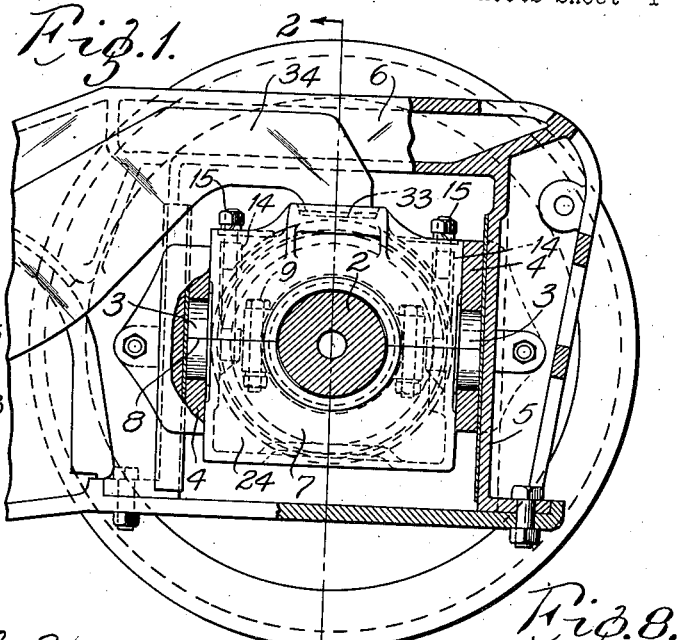
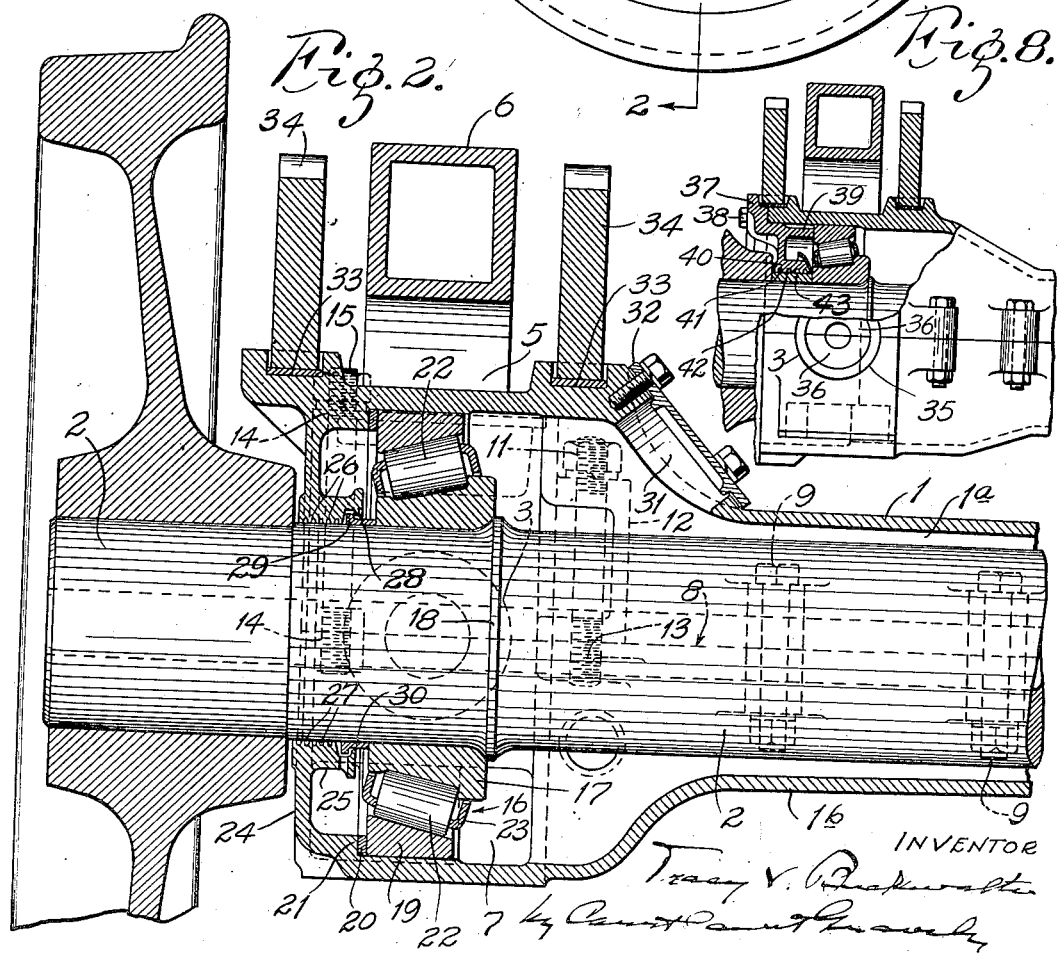

May 31, 1932.    T. V. BUCKWALTER    1,860,702
AXLE HOUSING
Filed Dec. 3, 1930    2 Sheets-Sheet 2

INVENTOR:
T. V. Buckwalter
By Carr and Carr Crowley
HIS ATTORNEYS

Patented May 31, 1932

1,860,702

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

AXLE HOUSING

Application filed December 3, 1930. Serial No. 499,679.

My invention relates to axle housings that are adapted for use with the general type of railway car and engine truck construction wherein the axle housings completely enclose the axle and antifriction bearings are interposed between the housing and axle. With this type of construction, in order to inspect the bearings, a dismantling of the entire axle assembly including removing of the wheels, is necessary which results in interference with the bearing adjustment when the parts are put back together; and the principal object of this invention is to devise an axle housing which will allow inspection of the entire bearings with a minimum amount of dismantling which will not alter the bearing adjustment.

My invention consists principally in providing a two-piece housing for engine and car axles comprising an upper and lower section that are secured together by removable fastening means. It also consists in the parts, combinations and arrangements of parts hereinafter described and claimed.

Figure 3:
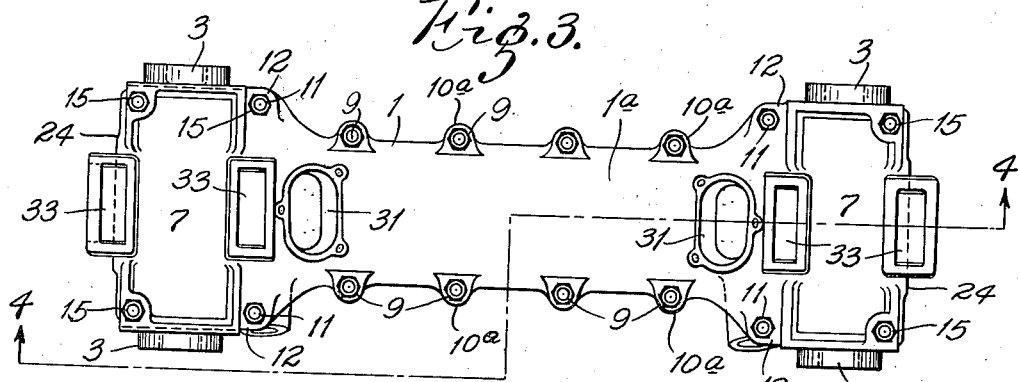
Figure 4:
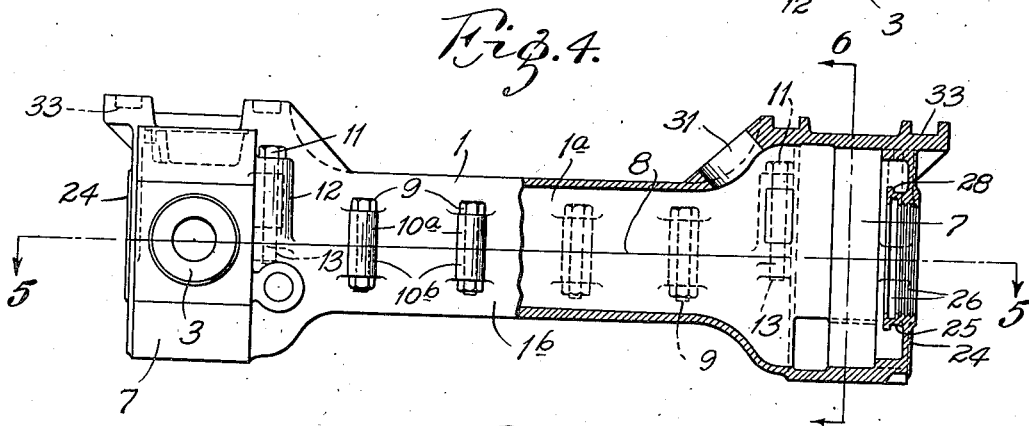
Figure 5:
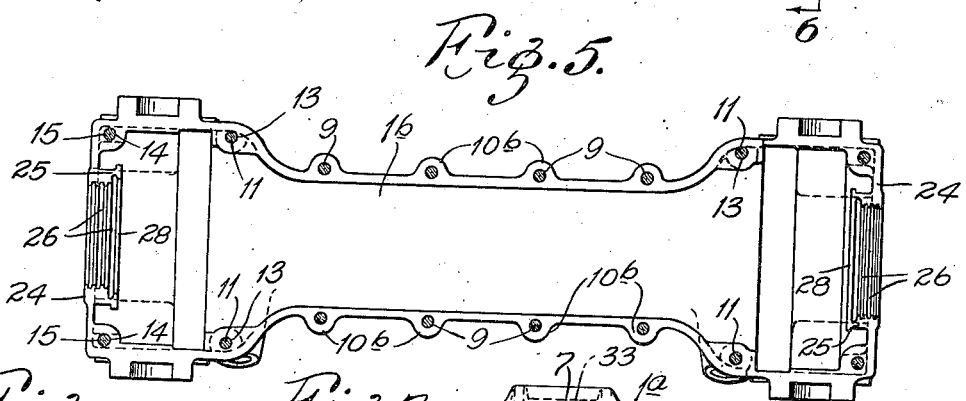
Figure 6:
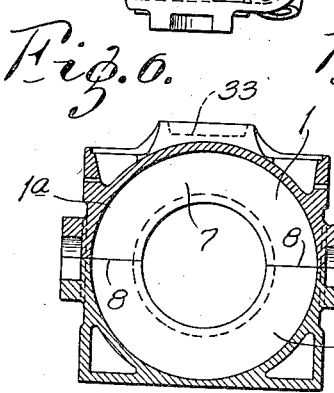
Figure 7:
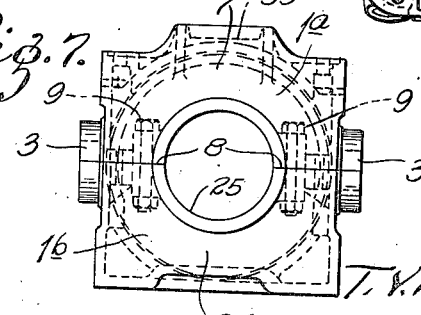

In the accompanying drawings, which form part of this specification, and wherein like reference numerals refer to like parts wherever they occur, Fig. 1 is a side view partly in section, and with the wheel removed, of one end of an engine truck equipped with an axle housing embodying my invention, Fig. 2 is a sectional view along the line 2—2 of Fig. 1, Fig. 3 is a top view of the axle housing, Fig. 4 is a view along the line 4—4 of Fig. 3, Fig. 5 is a view along the line 5—5 of Fig. 4 looking down on the bottom half of the housing, Fig. 6 is a view along the line 6—6 of Fig. 4, Fig. 7 is an end view of the housing, Fig. 8 is a side view partly in section of a modified form of axle housing, and Fig. 9 is an end view partly in section of the modified form of axle housing shown in Fig. 8.

My invention is particularly applicable for use with the general type of truck construction disclosed in my Patent No. 1,722,035 dated July 23, 1929 and for the purpose of illustrating my invention, I have shown an end portion of this type of truck, wherein the ends of the axle housing 1 enclosing axle 2, are provided with projecting trunnions 3 that fit in a trunnion block 4 slidably mounted in pedestal jaws 5 of the truck side frame 6.

In the present invention, the axle housing 1, which is enlarged at each end to form journal box portions 7, is split along the horizontal center line as at 8 to form an upper half portion 1a and a lower half portion 1b. The two half portions along the central tubular part of the housing are held together by means of bolts 9 which extend through and have threaded engagement with oppositely disposed lugs 10a on the side of the top half portion 1a, and lugs 10b on the lower half portion or section 1b. The flared out ends or journal box portions 7 of the housing are further held together by means of bolts 11 which extend through lugs 12 provided on each side of the upper half portion of the housing and into threaded holes 13 tapped into the wall of the lower portion of the housing which is enlarged or flared out to accommodate said holes, and the endmost corners of the journal box portions of both the upper and lower sections of the housing are also provided with openings 14 which receive bolts 15 whose lower ends are threaded so as to engage and secure the lower section 1b of the housing.

Roller bearings 16 are interposed between the axle 2 and axle housing 1 near each end thereof, each of said bearings comprising a cone 17 whose large end abuts against an annular thrust rib 18 provided on said axle, a cup 19 seated in the journal box portion 7 of the housing assembly whose large end abuts an annular adjustment ring 20 which is interposed between said cup and an annular shoulder 21 formed on the inside of said housing. Rollers 22, mounted in a suitable cage 23, are interposed between said cup and said cone. Instead of having the bearings enclosed by a removable end plate as is customary, my bearings are enclosed by an end plate 24 comprising an integral part of the housing which is of course split horizontally along the center, and is provided with an inwardly extending annular flange 25 whose inner periphery surrounds and engages the axle 2 and is provided with suitable grooves 26 for sealing rings 27. The inner end of said flange is also provided with a vertically disposed flange 28 which overlaps an annular flange 29 provided on the outer edge of an oil flinger ring 30 which is mounted on the axle 2 and pressed against the smaller end of the cone. Preferably a hand hole opening 31 provided with a removable cover 32 is located in the top of the upper half portion of the housing on the sloping part of the journal box portion for partial inspection and oiling of the bearings.

The top half portion of the journal box part of the housing is also provided with two seats 33 on which are supported equalizing members 34 disposed on each side of the side frame member such as described in my other patent hereinabove referred to.

The assembly of the axle, bearings, and housing is as follows: The bearings are placed on the ends of the axle and pressed to seat against the thrust rib 18 provided on the axle, and the oil flinger ring 30 is then mounted on the axle and seated against the smaller end of the cone 17. The cup 19 is now held firmly in position on the cone and roll assembly, and the distance from the back face of the cup at one end of the axle to the back face of the cup at the opposite end of the axle is then carefully measured. Preferably a space of approximately one-quarter inch is allowed for machining the housing between the back face of cup and adjacent shoulder in the housing ends, and the adjusting ring is then accurately faced to allow for proper running clearance of the bearings and placed in position. The wheels are then pressed on the axle ends to position, and the two half sections of the housing are then placed in position and bolted together as shown and described.

Although the hand holes provide for casual inspection of the bearings, when it is desirable to thoroughly inspect the bearings, it is a simple matter to remove the entire axle assembly. It is only necessary to jack up the truck side frame so as to release it from the housing, remove the bolts that hold the two portions of the housings together, and then the lower part of the housing can be dropped and the upper part raised, leaving the bearings out in the open for inspection.

In the modification illustrated in Fig. 8, the central tubular portion of the housing is held together in a similar manner to that of the preferred form, however, other suitable means is used for holding the endmost journal box portions of the housing together. The bolts 11 and 15 which secure the endmost portions of the housing together, are replaced by rings 35 which fit over the projecting semi-annular bosses 36 which together constitute the circular trunnions 3 and the end plate is not split and made an integral part of the housing, but is constructed as a separate removable end plate 37 which is secured to the housing by means of bolts 38 extending through said plate and having threaded engagement with the assembled upper and lower portions of the housing. The end plate is provided with an inwardly extending annular flange 39 whose inner edge engages the large end of the cup, and said end plate is also provided with a second annular flange 40 whose inner periphery is provided with suitable grooves 41 for sealing rings 42 and which surrounds and engages an annular spacer ring 43 mounted on the axle and interposed between the cone and wheel hub.

From the above description, it is obvious that since the initial adjustment of the bearings will in no wise be affected by the partial dismantling of the axle housing required to inspect the bearings, no further adjustment is necessary in reassembling the housing and related parts. It is also obvious that with this construction, when the housing is removed, there is ample clearance to pass a bar back of the wheel hub for removal of the same, which is impossible when using a separate one piece casting for the enclosure, whereby the wheels must be then pulled from the outer rim which sets up undesirable stresses in wheel plate and tends to distort the same. This is an added advantage of my invention.

Obviously, I do not wish to be limited to the precise construction shown as numerous changes in the construction illustrated may be made without departing from the spirit of my invention.

What I claim is:

1. A railway car axle housing adapted to enclose roller bearings including an outer bearing member assembled on a solid axle, comprising an upper section, a lower section, and removable fastening means for holding the two sections of said housing together.

2. A railway car axle housing adapted to enclose roller bearings interposed between the axle and housing, comprising an upper section, and a lower section, each of said sections having oppositely disposed lugs extending from their sides, and bolts extending through said lugs for holding the two sections of said housing together.

3. A housing for a railway car axle adapted to enclose roller bearings interposed between said housing and said axle near each end thereof, comprising a central tubular portion whose ends are flared out to form enlarged journal box portions, said housing being split horizontally substantially along the middle forming upper and lower sections, and removable fastening means for holding the two sections together.

4. A housing for a railway car axle adapted to enclose roller bearings interposed between said housing and said axle near each end thereof, comprising a central tubular portion whose ends are flared out to form enlarged journal box portions, said housing being split horizontally along the middle to form an upper section and a lower section, oppositely disposed lugs extending from the sides of said upper section and said lower section along the central tubular part thereof, bolts extending through said lugs and removable fastening means provided on the journal box portions of said housing for holding the two end portions of said housing together.

5. A railway car axle housing adapted to enclose roller bearings between the axle and housing comprising an upper section and a lower section, each of said sections being enlarged at their ends and provided with semicircular trunnions which cooperate with each other to form circular trunnions on both sides of the enlarged end portions of said housing, and removable fastening means for holding the two sections of said housing together.

6. A solid railway car axle, a housing therefor, roller bearings including an outer bearing member assembled on said axle and interposed between said axle and said housing, said housing comprising an upper section and a lower section and removable fastening means for holding the two sections together.

7. A railway car axle, a horizontally split housing therefor forming upper and lower sections, roller bearings interposed between said axle and said housing, hand holes provided in said housing for casual inspection of said roller bearings, and removable fastening means for holding said upper and said lower sections of said housing together.

8. An axle, a horizontally split housing therefor forming an upper and lower portion, roller bearings interposed between the axle and housing near each end thereof, removable fastening means for holding the two portions of said housing together, and semicircular integral end plates provided on each portion of said housing which form circular end plates when the two portions of said housing are held together.

9. A railway car axle, a horizontally split housing therefor having a central tubular portion which is flared out at both ends to form enlarged journal box portions, roller bearings interposed between the journal box portions of said housing and said axle, and removable fastening means for holding said housing together.

10. An axle having a rib near each end, a horizontally split housing enclosing said axle, said housing having a shoulder near each end and integral end plate portions having an inwardly extending annular flange surrounding said axle, an oil flinger ring mounted on said axle and having its outer end overlapped by said inwardly extending annular flange, a cone mounted on said axle having its larger end abutting against said rib and its smaller end engaging the inner end of said oil flinger ring, an adjustment ring mounted in said housing abutting against said shoulder, a cup mounted in said housing having its larger end abutting against said adjustment ring, rollers interposed between said cone and cup and removable fastening means for holding said housing together.

11. An axle housing adapted to enclose roller bearings interposed between the axle and the housing which is split along the horizontal center line, comprising a central tubular portion provided with lugs for receiving bolts to hold said housing together, oppositely disposed semicircular bosses extending from end journal box portions of said housing, and a removable ring mounted around each pair of oppositely disposed semicircular bosses to hold the journal box portions of said housing together.

12. An axle, a horizontally split housing therefor forming an upper and lower part, roller bearings interposed between said axle and said housing, each part of said housing being provided with co-operating semi-circular trunnions at each end which form cylindrical trunnions, a ring mounted around each cylindrical trunnion for holding the end portions of the housing together, and removable fastening means for holding the central tubular portion of said housing together.

Signed at Canton, Ohio, this 26th day of Nov. 1930.

TRACY V. BUCKWALTER.